United States Defensive Publication [19] (H) [11] T953,004

Parsons, III [43] Dec. 7, 1976

[54] THERMOSETTING POWDER COATING AND PROCESS

[76] Inventor: Theron E. Parsons, III, 4145 Skyland Drive, Kingsport, Tenn. 37664

[21] Appl. No.: 624,135

[22] Filed: Oct. 20, 1975

Related U.S. Application Data

[60] Continuation of Ser. No. 531,117, Dec. 9, 1974, abandoned, which is a division of Ser. No. 335,870, Feb. 26, 1973, abandoned.

[51] Int. Cl.[2] ..... C08L 1/26

[52] U.S. Cl. ..... 260/15; 260/850; 260/851

[57] ABSTRACT

A thermosetting powder coating composition comprising a resinous compound containing pendant hydroxyl groups such as alkyds, acrylics and cellulosics, a melamine formaldehyde resin and a catalyst is disclosed. The catalyst permits flow-out of the powder prior to becoming activated. A process for coating, using the composition, is also disclosed.

8 Claims, No Sheets Drawing,

11 Pages Specification

The file of this unexamined application may be inspected and copies thereof may be purchased (849 O.G. 1221, Apr. 9, 1968).